United States Patent Office.

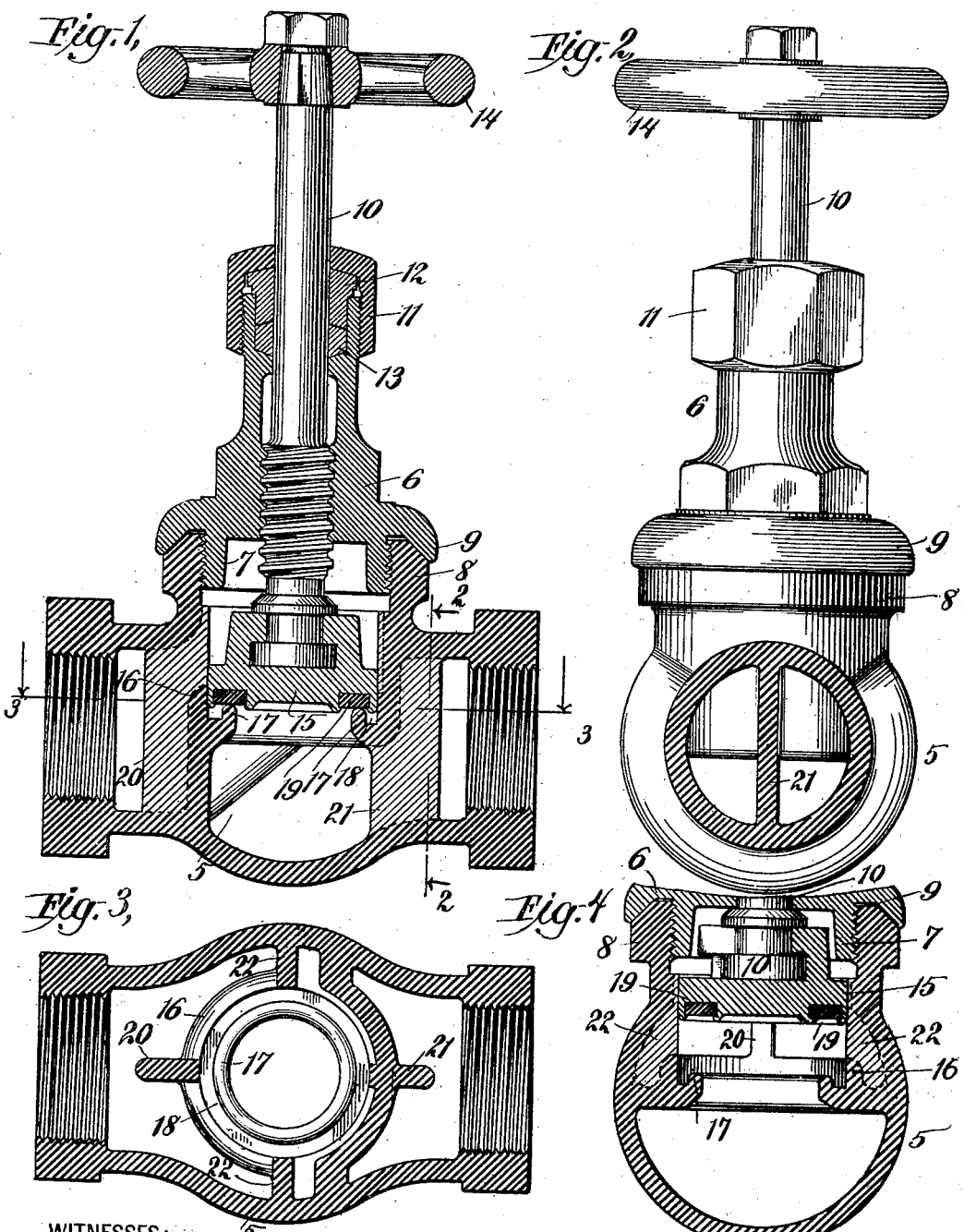

WILLIAM P. SKIFFINGTON, OF NEW YORK, N. Y., ASSIGNOR TO THE FAIRBANKS COMPANY, OF NEW YORK, N. Y., A CORPORATION OF NEW JERSEY.

VALVE.

SPECIFICATION forming part of Letters Patent No. 697,284, dated April 8, 1902.

Application filed February 11, 1901. Serial No. 46,788. (No model.)

*To all whom it may concern:*

Be it known that I, WILLIAM P. SKIFFINGTON, a citizen of the United States, and a resident of the borough of Manhattan, in the city of New York and State of New York, have invented new and useful Improvements in Valves, of which the following is a specification, reference being had to the accompanying drawings, forming part thereof.

My invention relates to valves; and it consists in the provision of means for tightly compressing the joint between the valve-body and bonnet and in means for strengthening and stiffening the valve seat and casing.

My invention further consists in certain details of construction and combinations of parts.

I will now describe a valve embodying my invention and illustrated in the accompanying drawings and will then point out the novel features in claims.

Figure 1 is a vertical longitudinal section of a globe-valve embodying my invention, showing the valve closed. Fig. 2 is an end elevation, partly in section, on the line 2 2, Fig. 1. Fig. 3 is a horizontal section on the line 3 3, Fig. 1. Fig. 4 is a vertical transverse section of the lower part of the valve.

The body 5 of the valve and the bonnet 6 are shown as secured together in the usual manner by the engagement of an externally-screw-threaded stem 7 at the lower part of the bonnet with an internally-screw-threaded stem 8 at the upper part of the body 5; but the bonnet is provided with an overhanging compressing-flange 9, having an inclined or conical inner surface, and the screw-stem 8 of the body has an inclined or conical outer surface, which is shaped to coact with and is shown as a counterpart of the conical inner surface of the flange 9, so that when the bonnet-stem is screwed down into the body-stem the flange 9 will tightly grip and compress the body-stem, thereby pressing the internal thread on the body-stem against the external thread on the bonnet-stem and insuring a tight joint not only between the compressing-flange and the body-stem, but also between the threaded stems themselves, and preventing any possibility of spreading the body-stem by too tight screwing down of the bonnet or cap. It will be observed that the greater the strain thus imparted to this threaded joint the greater will be the compressing action of the flange 9. This compressing-flange also prevents spreading of the body-stem by any strain imparted thereto from the valve-stem, and as the valve-seat and casing are made particularly strong and capable of resisting very heavy strain in consequence of my improved construction, as hereinafter described, the compressing-flange prevents any possibility of spreading the body-stem or neck, and thereby forcing off the bonnet or cap, with consequent escape of steam and possible scalding of the operator.

The valve-stem 10 is shown as threaded into the bonnet 6 in the usual manner and as provided with an operating hand-wheel 14, and a packed joint of usual construction, comprising the cap 11, gland 12, and packing 13, is located at the upper end of the bonnet 6.

The valve-disk 15 is shown as of ordinary construction and as engaging with and carried by the valve-stem 10; but the outer periphery of the valve-disk is made to fit quite closely within a wall or curb 16, surrounding the valve-seat 17. The valve-seat 17 is an annular bead or fillet and is separated from the surrounding annular curb 16 by an annular depression 18, and thus a clearance is formed around the valve-seat 17, and it is raised clear of surrounding parts, so as to permit it to freely receive the valve-disk. The seat portion of the valve-disk is shown as an annular ring 19, of suitable soft material, held in a groove in the under face of the valve-disk.

The valve is shown open in Fig. 4 and closed in Fig. 1. During the closing movement the valve-disk first meets and passes the upper edge of the curb 16, and thereby effects a closing of the fluid-passage with very slight leakage, and the further downward movement of the valve-disk is made with the fluid-passage substantially closed, and as the valve-disk approaches its seat there can be no wire-drawing action in proximity to the valve-seat or the face of the valve-disk, for the reason that the fluid-passage is then practically closed and for the further reason that if there is any increase of velocity of the fluid, such as produces objectionable cutting action, this increase of velocity will occur between the periphery of the valve-disk and the curb, and therefore at points beyond the valve-seat and the engaging face of the valve-disk, and at the valve-seat and engaging face of the valve-disk the velocity of the fluid will be either normal or less than normal. So, also, during the opening movement of the valve the fluid-passage remains practically closed until the valve-disk has moved clear of the curb 16, and when the valve-disk has moved upward sufficiently to clear the curb and open the fluid-passage the valve-disk has moved away from its seat a sufficient distance to prevent any possibility of wiredrawing action, and the opening between the valve-disk and valve-seat is always considerably greater than between the curb and disk, and the velocity of the fluid passing between the valve-seat and valve-disk will be either normal or less than normal. Thus the valve-seat is effectively protected from the passage of fluid at high velocity, and therefore the usual serious impairment of the valve disk or seat resulting therefrom is prevented.

Valve-seats are at times subjected to great pressure by reason of the great leverage which is afforded at the operating hand-wheels. The provision of the curb 16 stiffens and strengthens the valve-seat as a unit and tends to prevent distortion thereof; but I further stiffen and strengthen the valve-seat as a unit and relatively to the casing and stiffen and strengthen the casing by the provision of strengthening-ribs extending from the valve-seat to the casing. I provide longitudinal ribs 20 21, integral with and extending from the valve-seat to the upper and to the lower walls of the casing and integral with the casing. These ribs are narrow, so as not to materially obstruct the flow of fluid. I also form lateral ribs 22 22, extending from the upper wall of the casing to the valve-seat. All of these ribs also form guides for the valve-disk, and they are arranged in the direction of the pressure of the valve-disk upon the valve-seat, and they brace and stiffen the valve-seat and casing, so that distortion or springing is practically impossible, notwithstanding the presence of obstructions between the valve and seat, and consequent unevenness of pressure or the application of great pressure to the valve-seat under such condition or under any of the conditions to which such structures are ordinarily subjected.

It is evident that modifications may be made in the construction shown and above particularly described within the spirit and scope of my invention.

What I claim, and desire to secure by Letters Patent, is—

1. The combination of the body of a valve and a bonnet therefor, such body and bonnet having overlapping engaging stems and means for securing them together, the outer engaging stem having a compressing-flange provided with an inclined inner surface and the inner engaging stem having an inclined surface coacting with the inclined inner surface of the outer stem, substantially as set forth.

2. The combination of the body of a valve and a bonnet therefor, the bonnet having a stem constructed to enter and engage with a stem of the body, and the bonnet having an overhanging compressing-flange with an inclined inner surface and the stem of the body having an inclined surface coacting therewith, substantially as set forth.

3. The combination of the body of a valve and a bonnet therefor, the body having a screw-stem and the bonnet having a screw-stem constructed to enter and engage with the body-stem, and the bonnet having an overhanging compressing-flange with a conical inner surface and the body-stem having a conical surface coacting therewith, substantially as set forth.

4. The combination with the casing of a valve, a valve-seat therein, a valve-disk coacting with such seat, and means for closing such valve-disk upon the seat, of ribs integral with the casing and seat and extending from the valve-seat to the walls of the casing in opposite directions, substantially as set forth.

5. The combination with the casing of a valve, a valve-seat therein, a valve-disk coacting with such seat and means for closing such valve-disk upon its seat, of longitudinal ribs integral with the casing and seat and extending from the valve-seat to the walls of the casing in opposite directions and substantially in the direction of the pressure of the valve-disk upon the seat, substantially as set forth.

6. The combination with the casing of a valve, a valve-seat therein, a valve-disk coacting with such seat and a screw-stem therefor, of the longitudinal ribs 20 and 21, integral with the valve-seat and casing and extending from the valve-seat to the walls of the casing in opposite directions, and the lateral ribs 22, 22, also integral with the valve-seat and casing and extending from the face of the valve-seat to the casing, all of said ribs being substantially in the direction of pressure of the valve-disk upon the seat, substantially as set forth.

7. A valve comprising a casing, the valve-seat 17 therein, an annular curb 16 surrounding the valve-seat, a valve-disk coacting with such seat and curb, means for operating the valve-disk, and longitudinal ribs 20 and 21, integral with the valve-seat, curb and casing and extending from the valve-seat to the walls of the casing in opposite directions, substantially as set forth.

8. The combination with the casing of a valve, the valve-seat 17 therein, an annular curb surrounding the valve-seat, a valve-disk coacting with the valve-seat and curb, means for operating the valve-disk, longitudinal ribs 20 and 21, integral with the valve-seat, curb and casing and extending from the valve-seat to the walls of the casing in opposite directions, and the lateral ribs 22, 22, also integral with the valve-seat, curb and casing and extending from the face of the valve-seat to the casing, all of said ribs being substantially in the direction of pressure of the valve-disk upon the seat, substantially as set forth.

9. The combination of the body of a valve and a bonnet therefor, such body and bonnet having overlapping engaging parts and means for securing them together, the outer engaging part having a compressing-flange provided with an inclined inner surface and the inner engaging part having an inclined surface coacting with the inclined inner surface of the outer part, a valve-seat in such body, a valve-disk coacting with such seat, a valve-stem constructed to press the valve-disk on the seat by engagement with the bonnet, and ribs integral with the body and seat and extending from the valve-seat to the walls of the body in opposite directions, substantially as set forth.

10. The combination of the body of a valve and a bonnet therefor, such body and bonnet having overlapping engaging parts and means for securing them together, the outer engaging part having a compressing-flange provided with an inclined inner surface and the inner engaging part having an inclined surface coacting with the inclined inner surface of the outer part, a valve-seat in such body, a valve-disk coacting with such seat, a valve-stem constructed to press the valve-disk on the seat by engagement with the bonnet, and longitudinal ribs integral with the body and seat and extending from the valve-seat to the walls of the body in opposite directions and substantially in the direction of the pressure of the valve-disk upon the seat, substantially as set forth.

11. The combination of the body of a valve and a bonnet therefor, such body and bonnet having overlapping engaging parts and means for securing them together, the outer engaging part having a compressing-flange provided with an inclined inner surface and the inner engaging part having an inclined surface coacting with the inclined inner surface of the outer part, a valve-seat in such body, a valve-disk coacting with such seat, a valve-stem constructed to press the valve-disk on the seat by engagement with the bonnet and longitudinal ribs 20 and 21, integral with the valve seat and body and extending from the valve-seat to the walls of the body in opposite directions, and the lateral ribs 22, 22 also integral with the valve seat and body and extending from the face of the valve-seat to the casing, all of said ribs being substantially in the direction of pressure of the valve-disk upon the seat, substantially as set forth.

12. The combination of the body of a valve and a bonnet therefor, the body having a screw-stem and the bonnet having a screw-stem constructed to enter and engage with the body-stem, and the bonnet having an overhanging compressing-flange with an inclined inner surface and the body-stem having a conical surface coacting therewith, a valve-seat in the body, a valve-disk coacting with such seat, a valve-stem constructed to press the valve-disk on the seat by engagement with the bonnet, an annular curb surrounding the valve-seat, longitudinal ribs 20 and 21, integral with the valve seat, curb and body and extending from the valve-seat to the walls of the body in opposite directions, and lateral ribs 22, 22, also integral with the valve-seat, curb and body and extending from the face of the valve-seat to the body, all of said ribs being substantially in the direction of pressure of the valve-disk upon the seat, substantially as set forth.

Signed at New York, N. Y., this 7th day of February, 1901.

WILLIAM P. SKIFFINGTON.

Witnesses:
HERBERT H. GIBBS,
HENRY D. WILLIAMS.